(No Model.) 2 Sheets—Sheet 1.
J. G. FALLS.
GIN SAW GUMMER.
No. 419,989. Patented Jan. 21, 1890
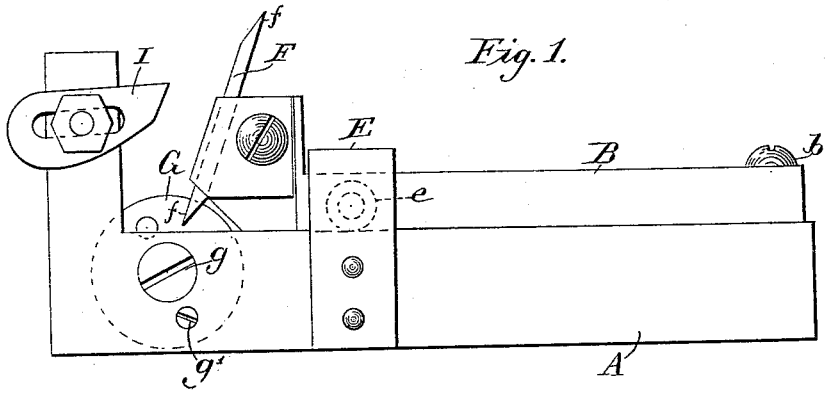
Fig. 1.
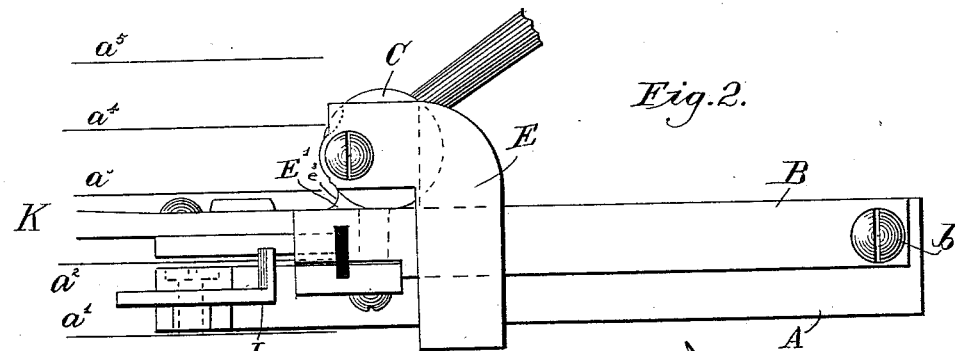
Fig. 2.
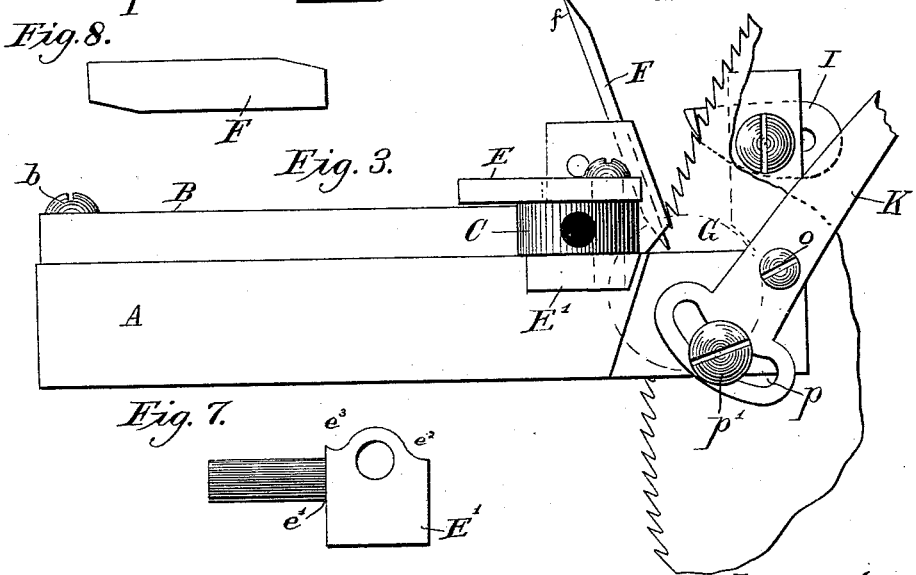
Fig. 8.
Fig. 3.
Fig. 7.
Witnesses:
T. R. Stuart.
Robert Mason.
Inventor:
Jesse Gilbreth Falls
B. Jm. Pollard atty (No Model.) 2 Sheets—Sheet 2.

J. G. FALLS.
GIN SAW GUMMER.

No. 419,989. Patented Jan. 21, 1890.

Witnesses:
T. R. Stuart
Robert Mason

Inventor:
Jesse Gilbreth Falls
By J. M. Pouard atty

UNITED STATES PATENT OFFICE.

JESSE GILBRETH FALLS, OF MEMPHIS, TENNESSEE.

GIN-SAW GUMMER.

SPECIFICATION forming part of Letters Patent No. 419,989, dated January 21, 1890.

Application filed September 4, 1888. Serial No. 284,586. (No model.)

*To all whom it may concern:*

Be it known that I, JESSE GILBRETH FALLS, a citizen of Memphis, Shelby county, Tennessee, have invented a new and useful Gin-Saw Gummer, of which the following is a specification.

My invention relates to improvements in gin-saw gummers of the class designed to re-tooth and sharpen the saws without removing them from the cylinder or disturbing their relation to each other; and the objects of my improvement are, first, to provide a more perfect adjustment of the machine to the angle of tooth desired; second, a more direct and powerful action of the actuating-cam upon the shearing-punch; third, a more rigid fastening device for the die; fourth, a more perfect reciprocation of the punch through the die, and, fifth, more exact guides for the operating-cam, punch-carrier arm, and tooth-spacing mechanism. I attain these objects by the mechanism illustrated in the accompanying drawings, in which—

Figure 4:
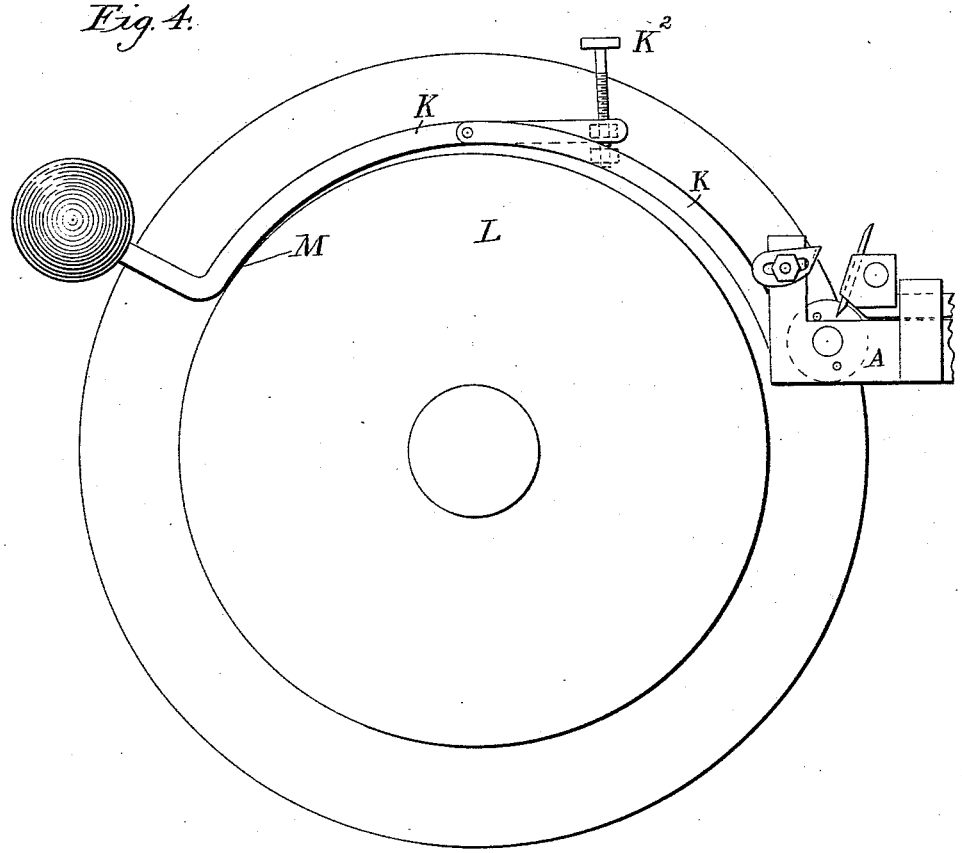
Figure 5:
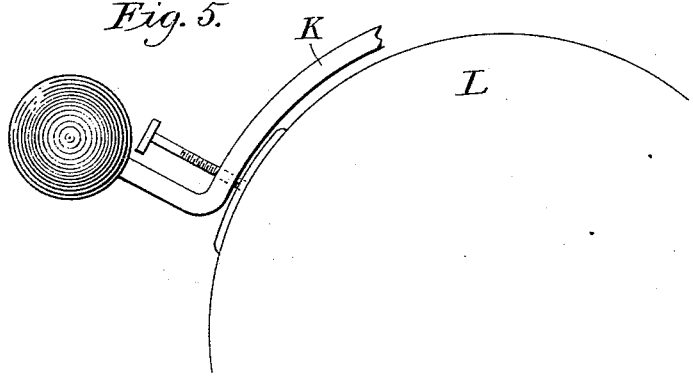
Figure 6:
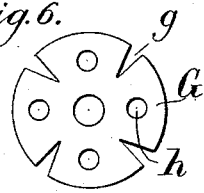

Figure 1 is a left-hand side elevation of my gin-saw gummer; Fig. 2, a plan view of same with the shearing-punch removed, and showing the machine in place between the saws of a Huller gin-cylinder; Fig. 3, a right-hand side elevation of the same device; Fig. 4, a side elevation of a part of the same device, showing the adjustable arm for varying the angle of tooth; Fig. 5, a side elevation of a modification of the latter; Fig. 6, a side view of the revoluble die; Fig. 7, a plan view of the lower lug for the cam-pivot; Fig. 8, a plan view of the punch.

Like letters indicate like parts in the several views.

A in the drawings designates the body or foundation of the machine, and is shown in Figs. 1, 2, and 3 of actual size. It is a stiff bar of steel, nearly square, and grooved or slotted at one end to permit the introduction of the edge of the saw that is to be acted upon. This groove is vertical, as shown in plan in Fig. 2.

Pivoted to the rear end of the bar A by the pivot-pin $b$ is the punch-carrier and guide-arm B. This arm is actuated by the cam C, and reciprocates horizontally between the guide E and bar A, carrying the punch F through the slot in the die G, and thus forming or cutting the tooth in the saw $a^2$, as shown in Fig. 3. The arm B is returned to its first position by a coil-spring $e$. (Shown in dotted lines in Fig. 1.) The cam C is actuated by a handle A. The punch F is made reversible, so that each of its ends may be used, and is beveled from its edge back to the point, so that its action when cutting is that of a shear or continuous cut from the point of the tooth to the base thereof.

A spacing-guide I, adjustably secured to a vertical extension of the bar A, serves the double purpose of spacing the successive teeth for the cutting mechanism and of sustaining the front portion of the apparatus which is overbalanced upon this guide as a pivot by a weighted extension-arm adjustably secured to the bar A, and which rests at a point M upon the rear curved surface of the spacing-block L of the gin-cylinder. This draws the device against the front edge of the saw, keeping the guide I and cutting mechanism in proper position, and also determines the angle of the tooth to be cut.

To provide for very exact adjustment to any desired angle of tooth, as well as to adapt the apparatus to cylinders of various diameters of both saws and spacing-blocks, the arm K has an adjustable connection with the bar A. The die G is secured to the inner side of the slot in the bar A by a screw, upon which it may revolve about its center to bring any one of its slots into position for the punch, and is, when in such position, rigidly secured by a screw $g'$ passing through the bar A and into one of the holes $h$ of the die, thus making it immovable.

The operation of the device and the action of the various improvements enumerated are as follows: The operator grasps the bar A in his left hand and the handle H in his right, and, holding the left hand stationary, brings the handle A around toward it. This rotates the cam C something more than an eighth of a turn about its pivot and forces the bar B to the left, carrying with it the punch F through the slot in the die, and thus shearing a tooth in the saw. So far as above described this action is that of former gin-saw gummers, which I am to improve.

It was shown by experience that several very troublesome difficulties were encountered. The beveled cutting-edge $f$ of the punch caused it to rise out of the slot in the die, thus destroying the exact relation between the two that is indispensable to perfect work, and this caused the metal in process of being sheared or cut to bend or project into the die, bending the teeth and making them imperfect, and revolving the die in one or the other direction and out of its proper position. To remedy this, I firmly rivet the vertical portion of the guide E to the bar A and adjustably secure the horizontal portion against upward displacement by means of the screw which constitutes the pivot of the cam C. By this means the guide E may be sprung or drawn down, so as to hold the arm B rigidly down to its work and to prevent any tendency to twisting the pivot-screw $b$.

Another difficulty developed by practice was in the bending of the pivot-pin of the cam, which was heretofore unsupported at its upper end, or by the bending of the lug E' at the point $e'$ of its junction with the bar A, thus bringing the corner of the cam C into action with the arm B. Even when these parts were not permanently distorted there was always sufficient spring or yielding to prevent the even and perfect contact of the vertical face of the cam and side of the bar B, which is essential to the perfect action of the punch and die. The guide E, constituting a second supporting-lug for the pin, prevents any spring of the parts and holds them rigidly to their work. It should be stated in this connection that this work is very severe even when cutting ordinary gin-saw steel one twenty-fourth of an inch in thickness, as it is tempered to a considerable degree of hardness.

In the machines heretofore used the cam C was located too far back of the cutting-punch and die, thus causing a considerable spring of B and its pivot $b$. In order to obtain a point of bearing for the cam C upon the arm B as nearly as possible opposite to the cutter, I extend the pivoted point of the cam forward between the saws by cutting out the metal of the lug E' at $e^2$ and $e^3$ and by beveling its entire forward edge, as shown in Fig. 3. This reduces the leverage against the pivot $b$ and greatly lessens the spring of the bar B and the power required to perform the cutting.

In former devices the spacing-guide was attached to a movable arm instead of directly to a rigid extension of the bar A, as in my device. By this latter construction I am enabled to adjust the spacing-guide very exactly with reference to the cutter, and it is then not disturbed by subsequent adjustment of the weighted arm K.

As previously stated, the arm K by its adjustable connection with the bar A and point of contact with the spacing-block L determines the angle of the cutters to the edge of the saw. Heretofore this angle has been determined by means of braces extending from the lower surface of the bar A to and bearing against the front of the spacing-block between the saws, while the arm, pivoted by a single screw to the bar A, was permitted some degree of play or movement around said pivots.

In my improved device the arm K and bar A are absolutely rigid in their relation to each other after having been fixed in position; and to this end the connection consists, essentially, in a double fastening, as in Fig. 3, where the arm is pivoted by a screw $o$ to the bar A, and has a slotted extension, as at $p$, with a jam-screw $p'$ to secure it rigidly in its adjusted position.

In using this device I tighten the screw $o$ and place the apparatus in position upon the cylinder, with the arm K resting upon the block L and with the guide I and punch F resting in the teeth of the saw. I then use sufficient force to make the parts turn about the pivot $o$ until the desired angle is secured, when by carefully removing the machine from the saw the parts are retained in position until the screw $p$ can be tightened, so as to hold them securely. An equivalent of this construction is shown in Fig. 4, where I illustrate an adjustable arm pivoted at its center, the portion K' being supposed rigidly attached to the bar A, and the angle of the device to the saws variable, by means of the screw $K^2$ acting through a swivel-nut. (Shown in dotted lines.) Another modification would be the construction shown in Fig. 5; but I do not limit myself to any specific construction.

Having thus described my invention, I claim—

1. In a gin-saw gummer, the bar A, supporting the die-cutter and operating-cam and having the integral vertical arm and the spacing-guide adjustably attached thereto, substantially as and for the purpose specified.

2. In a gin-saw gummer, the bar A and its supported parts, as described, having the integral vertical arm and spacing-guide adjustably attached thereto, and the arm K, adjustably attached to bar A upon the side thereof opposite the vertical arm, substantially as and for the purpose shown.

3. In a gin-saw gummer, the bar A, in combination with the arm B, pivoted thereto, the guide E, having the vertical portion integral with or attached to the bar, and the horizontal portion extending over the arm B, and the screw clamping the end of the guide to the bar, so that the guideway for the arm B can be adjusted, substantially as and for the purpose set forth.

4. In a gin-saw gummer, the bar A, substantially as set forth, having the lug E' located near its forward end, and the guide-lug E extending in a forward direction, in combination with the pivoted arm B and cam C, having the screw-pivot N uniting said lug and guide, substantially as and for the purpose set forth.

5. In a gin-saw gummer of the class described, in combination with the operating-cam and the pivot thereof, the bar A, having the cam-pivot supporting-lug E', provided with grooves $e^2 e^3$, so as to allow the cam-pivot to be projected forward between two saws, substantially as and for the purpose specified.

6. In a gin-saw gummer, the die G, having the slots $g$ and pin-holes $h$, whereby the die may be securely locked in position, as set forth.

7. In a gin-saw gummer having a die, a cutter, and operating mechanism, a weighted bar for counterbalancing the gummer, said bar provided with a screw-actuated adjusting device for varying the angle of the gummer with reference to the saws, substantially as and for the purpose set forth.

JESSE GILBRETH FALLS.

Witnesses:
 HUNSDON CARY,
 W. D. DAVIS, Jr.